UNITED STATES PATENT OFFICE.

AUGUSTUS MILLER, OF GRAFTON, OHIO.

IMPROVED METHOD OF MAKING SOAP.

Specification forming part of Letters Patent No. 25,517, dated September 20, 1859.

*To all whom it may concern:*

Be it known that I, AUGUSTUS MILLER, of Grafton, in the county of Lorain and State of Ohio, have invented a new and Improved Mode of Making Chemical Soap; and I do hereby declare that the following is a full and exact description of the ingredients used therein and the mode of compounding the same.

The nature of my invention relates to the herein-described mode of compounding the ingredients and chemicals herein named, by which a valuable soap is formed, either for washing or toilet purposes, and also to the ingredients and chemicals used making up the said compound.

In making or compounding the herein-described soap, I take six gallons of pure soft water, six pounds of German erasive soap, one pound of soda, four ounces sulphuric ether, three ounces aqua-ammonia, two ounces nitric ether, two ounces nitrate potassa, two ounces spirits camphor, one ounce common alum, two ounces gum-resin, and unite them as hereinafter specified. I first place the water in a metallic vessel of suitable size and bring it to a boiling-heat. I then add the German erasive soap and stir it till it is all dissolved. I then add the other ingredients named in the order in which they are enumerated, with constant stirring, which should be continued for five minutes after the last is added. It may now be poured into suitable vessels to cool, and the process is completed.

The above-named ingredients, compounded as herein described, will produce fifty pounds of good soft chemical soap. I wish, however, to state that the ingredients may be somewhat varied in their proportions without essentially changing the result. Neither is it important that they be added in the exact order enumerated.

Bar-soap is made by cutting into suitable form and drying in a cool place.

What I claim as my improvement, and desire to secure by Letters Patent, is—

A soap manufactured from the herein-named ingredients and chemicals, when the same are compounded substantially in the manner and for the purpose specified.

AUGUSTUS MILLER.

Witnesses:
W. H. BURRIDGE,
HENRY VOTH.